United States Patent
Irace et al.

(10) Patent No.: US 12,493,917 B2
(45) Date of Patent: Dec. 9, 2025

(54) POWER DISTRIBUTION SYSTEM HAVING A NETWORK OF SMART METERS

(71) Applicant: ARCA HOLDING ASSOCIATED ENGINEERS LTD, London (GB)

(72) Inventors: Andrea Irace, Naples (IT); Francesco Arena, Messina (IT)

(73) Assignee: ARCA HOLDING ASSOCIATED ENGINEERS LTD, London (GB)

( * ) Notice: Subject to any disclaimer, the term of this patent is extended or adjusted under 35 U.S.C. 154(b) by 49 days.

(21) Appl. No.: 17/756,067

(22) PCT Filed: Nov. 17, 2020

(86) PCT No.: PCT/IB2020/060809
§ 371 (c)(1),
(2) Date: May 16, 2022

(87) PCT Pub. No.: WO2021/099933
PCT Pub. Date: May 27, 2021

(65) Prior Publication Data
US 2022/0405867 A1 Dec. 22, 2022

(30) Foreign Application Priority Data
Nov. 18, 2019 (IT) .......... 102019000021459

(51) Int. Cl.
*G06Q 50/06* (2024.01)
*G01R 21/133* (2006.01)
*H02J 13/00* (2006.01)

(52) U.S. Cl.
CPC ......... *G06Q 50/06* (2013.01); *G01R 21/1333* (2013.01); *H02J 13/00006* (2020.01)

(58) Field of Classification Search
CPC .............. G06Q 50/06; H02J 13/00006; G01R 20/1333

(Continued)

(56) References Cited

U.S. PATENT DOCUMENTS

2009/0267792 A1  10/2009  Crichlow
2014/0277788 A1*  9/2014  Forbes, Jr. ............... H02J 3/14
                                                         700/286

(Continued)

FOREIGN PATENT DOCUMENTS

AU  2007291370 A  *  3/2008  ............ H04L 67/61
CN  204376538 U  *  6/2015

(Continued)

OTHER PUBLICATIONS

Patent Cooperation Treaty, International Search Report and Written Opinion for International Application No. PCT/IB2020/060809, Feb. 17, 2021, 14 pages.

*Primary Examiner* — Akiba K Robinson
(74) *Attorney, Agent, or Firm* — Stetina Garred Brucker & Newboles (57) ABSTRACT

A power distribution system comprises a first Smart Meter device for metering the power absorbed or yielded by a domestic utility, in which said first Smart Meter device is connected to a power distribution grid and dialogs in real time with other Smart Meters connected to other domestic utilities, in which said other Smart Meters are connected to the same power grid of said first Smart Meter device, in which said power distribution system is provided with multiple and comprehensive interconnections which connect said first Smart Meter device to the other Smart Meter nodes so as to form a network, in which the information on the energy production and consumption status of the network is available in each Smart Meter node of the network at all times, thus allowing the information on the energy status of the network to be instantaneously available to an operator of the power grid by querying a single Smart Meter among those present in the network.

21 Claims, 7 Drawing Sheets

(58) Field of Classification Search
USPC .................................... 705/412, 1.1, 7.11
See application file for complete search history.

(56) References Cited

U.S. PATENT DOCUMENTS

| | | | |
|---|---|---|---|
| 2015/0161020 A1* | 6/2015 | Matsuoka | G01F 15/063 |
| | | | 702/189 |
| 2019/0086235 A1 | 3/2019 | Cui et al. | |
| 2019/0089158 A1 | 3/2019 | Divan et al. | |
| 2019/0123580 A1 | 4/2019 | Bindea | |

FOREIGN PATENT DOCUMENTS

| | | | | |
|---|---|---|---|---|
| CN | 106302023 A | * | 1/2017 | |
| CN | 109272384 A | | 1/2019 | |
| IT | 102016000020629 A1 | | 3/2016 | |
| JP | 2020182299 A | * | 11/2020 | |
| KR | 20210001896 A | * | 1/2021 | ............ G06Q 50/06 |
| WO | WO-2012028918 A1 | * | 3/2012 | ........... G03G 15/065 |

\* cited by examiner

POWER DISTRIBUTION SYSTEM HAVING A NETWORK OF SMART METERS

CROSS-REFERENCE TO RELATED APPLICATIONS

This application claims priority to PCT International Application No. PCT/IB2020/060809 filed on Nov. 17, 2020, which application claims priority to Italian Patent Application No. 102019000021459 filed on Nov. 18, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to an intelligent multi-utility meter device of the "Smart Meter" type, with ad-hoc networking capacity.

In addition to the conventional and necessary metrology functions, the solution herein proposed allows an advanced network connectivity for the distributed monitoring in real time of the status of the power grid, a contactless proximity payment system and a diagnostic ability to characterize the electric loads connected thereto.

Prior Art

The electronic power metering devices in the prior art sample the power at high temporal resolution to obtain instantaneous voltage V and current I values over various distribution steps and to store the various quantities of power in order to transmit such information to the power distribution grid at regular time ranges. Thereby, there is the exchange of an increased data volume between the various electric power metering devices and a central processor located in the power distribution grid.

Document IT102016000020629 describes a Smart Meter device for sharing the power in the power distribution grids. The device operates in real and continuous time using a time-driven approach, in which the data is transmitted exclusively upon the occurrence of a given event. The events are transmitted in the network by providing the data relative to the significant dynamics, with timelines which are compatible with real-time regulating.

Various solutions are also known in the art, such as, for example the rebalancing techniques described in document US 2019089158 entitled "Systems and methods for edge of network voltage control of a power grid".

Other documents refer to the techniques for using cryptocurrencies, such as, for example document US 2019086235 entitled "Smart Power Meter".

Finally, the distributed billing problems have already been dealt with, as disclosed in document CN 109272384 entitled "A method and system for selling electricity of a distributed smart meter".

Documents US2019/0123580 and US2009/0267792 show connectivity examples of the Smart Meter in geographic mesh type networks, for increasing the redundancy of the connections in order to ensure an increased querying probability of the individual meter in order to recover the information on consumption.

SUMMARY OF THE INVENTION

Digitization is transforming the commercial architecture in the energy field by redrawing the boundaries and redefining the interaction between consumers and suppliers, for example of power.

The advancements in technology, telecommunications and data analysis are responsible for the radical change of the ecosystem for the power distribution system operators DSOs, consumers and suppliers.

Digitization allows the distribution system operators DSOs to have an in-depth knowledge of and to control the networks which to date, were considered passive due to the structure thereof.

Thereby, the networks may reach an increased level of efficiency and modernize the communication thereof towards the clients.

This invention aims to develop an efficient use of the digital infrastructure by the electric utilities, and more precisely by the Distribution System's Operators DSOs.

For this purpose, an optimization strategy in using the resources available in the power distribution grids is also proposed.

In particular, the invention is in the field of intelligent energy networks (known as smart grids) for enabling the various players to communicate with each other while overcoming the conventional hierarchical architecture within a new view of sharing information among parties in any case using the conventional layer of communication which uses the same power distribution line itself (PLC—power line communication) as transmission cable.

The present invention is based on the development of a previous Italian Patent (102016000020629) and a prior Italian Patent Application (102019000003519).

The following invention allows improving:
- the automatic building ability of the ad-hoc smart networks with other similar devices thereof, for sharing information related to the energy commitments (production and consumption) of a group of domestic single-phase and three-phase utilities (island); such a network informs the individual meter of the consumption status of the entire network to which it is connected;
- the ability to characterize the loads associated with the network by implementing, in a cloud, a neural network that analyzes the voltage and current data measured locally;
- the possibility of also accepting payments in Near-Field Communication NFC technology, i.e. the short-range communication technology which is most commonly applied in the field of electronic payments, in addition to the conventional charging systems, and
- the connectivity with meters of other utilities, such as gas and water, which due to the nature thereof, may be digitally connected to the operator only by cellular phone network.

The present invention relates to a device for detecting/managing power, in the same way as a conventional Smart Meter (for example, the conventional Enel (Italian national electricity supply company) meter for reading power consumption), the innovative element of which is the possibility of autonomously interacting with the other Smart Meters connected to the same MV/LV (medium voltage/low voltage) transformer station in order to locally share the information on production, when present, and the information on consumption of each individual utility. Such information may be used to control and actively rebalance the voltages or re-phase the currents.

BRIEF DESCRIPTION OF THE DRAWINGS

Further features and advantages of the invention will become apparent from the following description provided by way of a non-limiting example, with the aid of the figures shown in the accompanying drawings, in which.

The parts according to the present description have been depicted in the drawings, where appropriate, with conventional symbols, showing only those specific details which are pertinent to the understanding of the embodiments of the present invention, so as not to highlight details which will be immediately apparent to those skilled in the art, with reference to the description provided below.

DETAILED DESCRIPTION OF THE INVENTION

Figure 1:
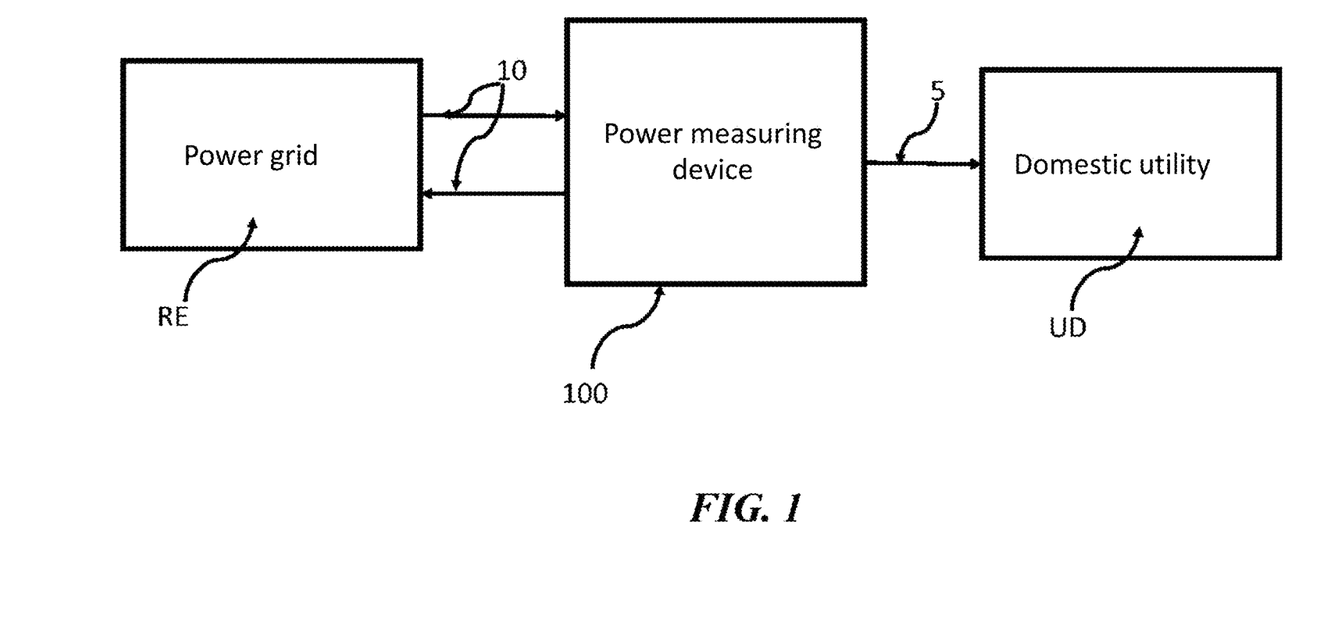
FIG. 1 shows the connection architecture of the Smart Meter to the power grid RE and to the consumption utility.

FIG. 1 describes the basic architecture of the solution herein proposed. In particular, the connection to the power grid may be simple, in the case of single-phase utilities, or more complex, in the case of three-phase utilities.

A power meter 100 (hereinafter also indicated as Smart Meter) in particular is connected 5 to a domestic utility UD and exchanges information with a two-way communication 10 with the power grid RE. It may be achieved in single-phase and three-phase version.

The invention consists of a new conception of the electronic power meter.

Figure 2:
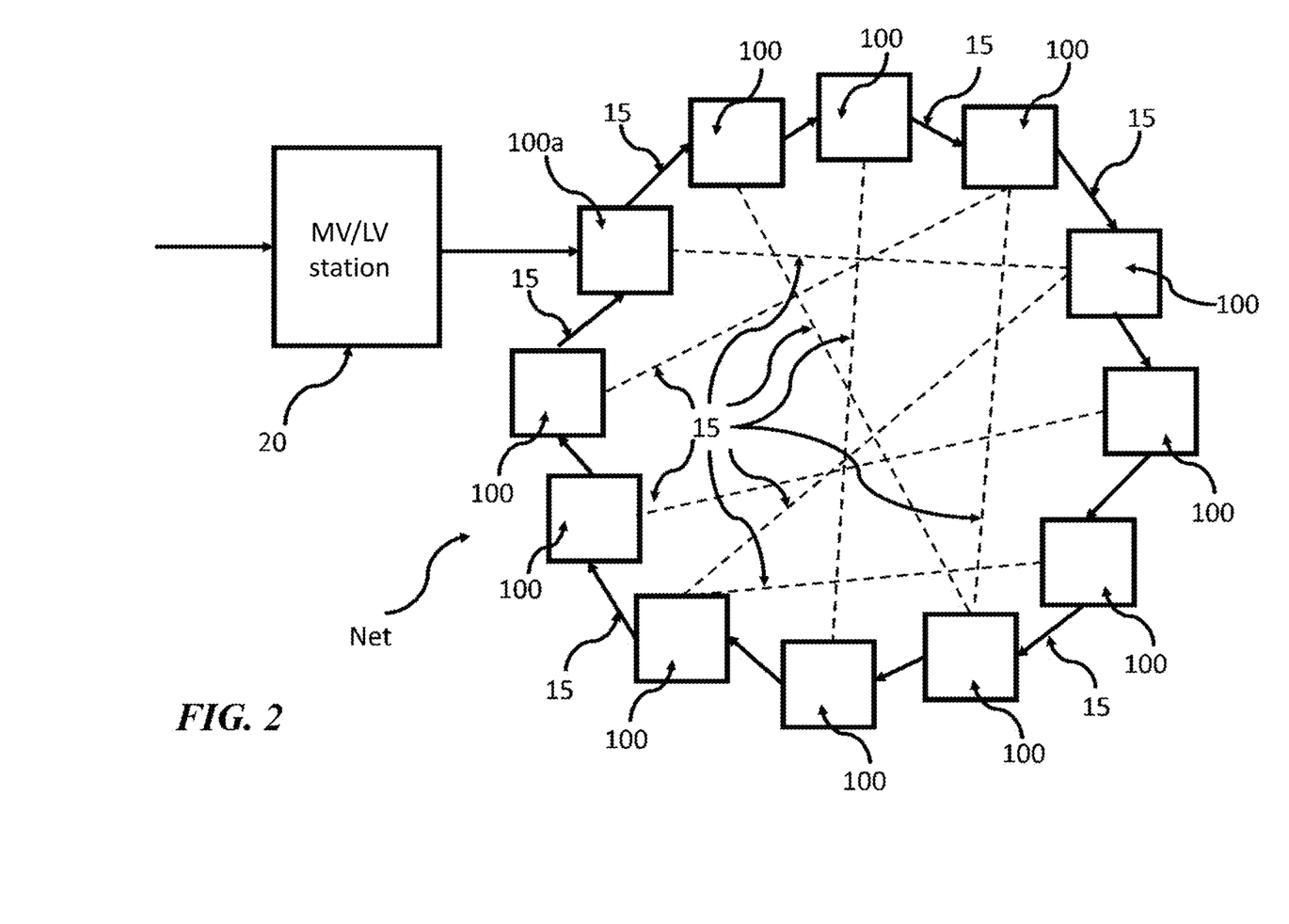
FIG. 2 shows a mesh connection of the individual Smart Meters downstream of the MV/LV distribution station.

In particular, with reference to FIG. 2, a first Smart Meter power meter 100a dialogs in real time with all the other Smart Meters 100 connected on a same distribution line which branches off from a MV/LV conversion station indicated in the drawing by numeral 20.

This exchange of information occurs in an entirely autonomous and transparent manner with respect to user UD connected to the Smart Meter 100.

The multiple and comprehensive interconnections 15 between the Smart Meter nodes 100 of network Net result in the information on the energy status of network Net (production and consumption) being available in each Smart Meter node 100 of the network at all times.

In particular, network Net is created so that each individual Smart Meter node 100 directly communicates with at least three other Smart Meter nodes 100, as shown in FIG. 2.

Naturally, the connections with the remaining Smart Meter nodes 100 occur with indirect connections and the passage (hop) through other Smart Meter nodes 100.

The information on the energy status of the network Net (production and consumption) is therefore instantaneously available to the power grid operator GRE by querying a single Smart Meter 100 present in network Net.

This shared information on the energy status of network Net is to be used to implement specific control practices, obviously in addition to the regular charging services used by the power grid operator GRE.

The capillary structure of the connections 15 between the Smart Meters 100 thus conceived makes it very easy for the power grid operator GRE to recover the status of network Net even in the presence of local or distributed breakdowns.

Therefore, there is an optimal fault-tolerance of network Net by virtue of the several connections 15 between the various Smart Meters 100. In particular, network Net is built so as to have a redundancy in the connections 15 so that each individual Smart Meter node 100 can be reached by a plurality of other Smart Meters 100.

The communications between the Smart Meters 100 occur through the standard G3, PRIME or Meters-and-More protocols on (conveyed wave) powerlines, i.e. already regulated worldwide contexts. The flexibility of the choice of the communication protocol makes the Smart Meter 100 usable practically in all the national and international contexts in which the communication protocols used by the operators are among those indicated above.

The Smart Meter 100 of the present invention has local connectivity according to wireless protocols, for example, but not limited to, Bluetooth, Wi-Fi, NFC, or wired protocols, for example, but not limited to, Ethernet, MODBUS, CANBUS.

The local connectivity allows the redundancy in the connectivity, innovative charging management methods (on-demand payments), interfacing with domestic consumption monitoring systems (smart plugs) and the energy profiling of the domestic utilities UD.

The wireless connectivity allows querying additional meter devices, such as, for example gas and water meters.

The aim of the solution herein described is a technological hub for managing all the domestic utilities UD which, due to the features thereof, are not suitable to remote management in areas in which the telephone signal coverage is not sufficient to use telecommunication systems based on the GSM paradigm.

Figure 3:
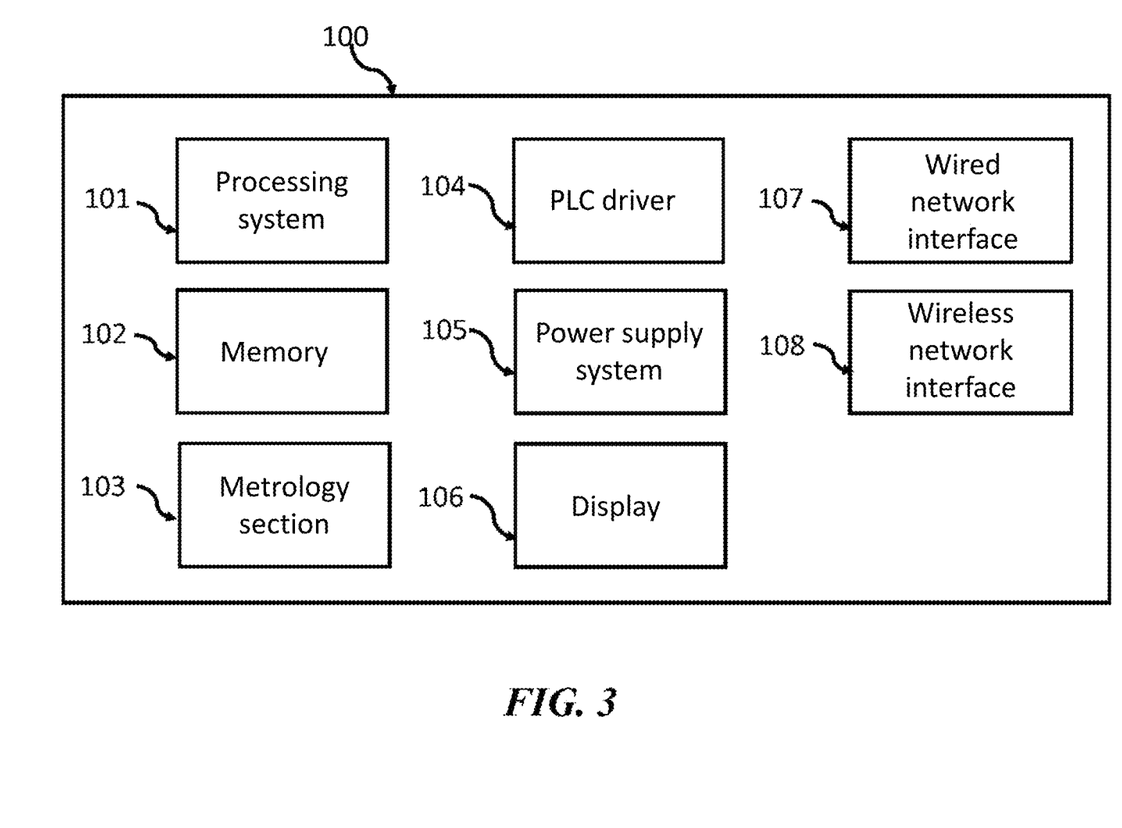
FIG. 3 shows the basic components which allow making the Smart Meter.

With reference to FIG. 3, each Smart Meter 100 comprises an information processing system 101, a memory 102, a metrology section 103, a PLC line driver 104, a power supply system 105, a display 106, one or more wired network interfaces 107, and one or more wireless network interfaces 108.

The existing prior art known by the inventors does not highlight anything similar, in that to date no Smart Meter exists which, by interacting with other Smart Power Meters, is capable of independently dialoging with the other meters to distribute the knowledge on the consumption status of the entire network and to establish an exchange of information aiming to optimize and improve the quality of the power supplies.

The electronic power metering devices in the prior art sample the power at high temporal resolution to obtain instantaneous voltage V and current I values and to store the various quantities of power in order to transmit this information to the power distribution grid operator at regular time ranges. Thereby, a given volume of data is exchanged between the various electronic power metering devices and a central processor located in the power distribution grid.

The device of the present invention resolves all the primary power metering functions through the metrology section 103. The sampling of the voltage and current (or of the voltages and currents in the case of three-phase utility) and the assessment of the power are carried in the metrology section 103 through integration algorithms of the electrical power metered. Such an operation may be carried out over any time range according to the legislative needs and to those of the power grid operator GRE.

The Smart Meter device 100 according to the invention has the same analog inputs as a conventional electronic meter; it operates in real and continuous time.

In addition to the algorithms already programed in the firmware for implementing the metering function, the Smart Meter device 100 according to the present invention has an autonomous algorithm for building an ad-hoc network connection, without operations by controller nodes upon the installation of the first Smart Meter on the network.

Figure 4:
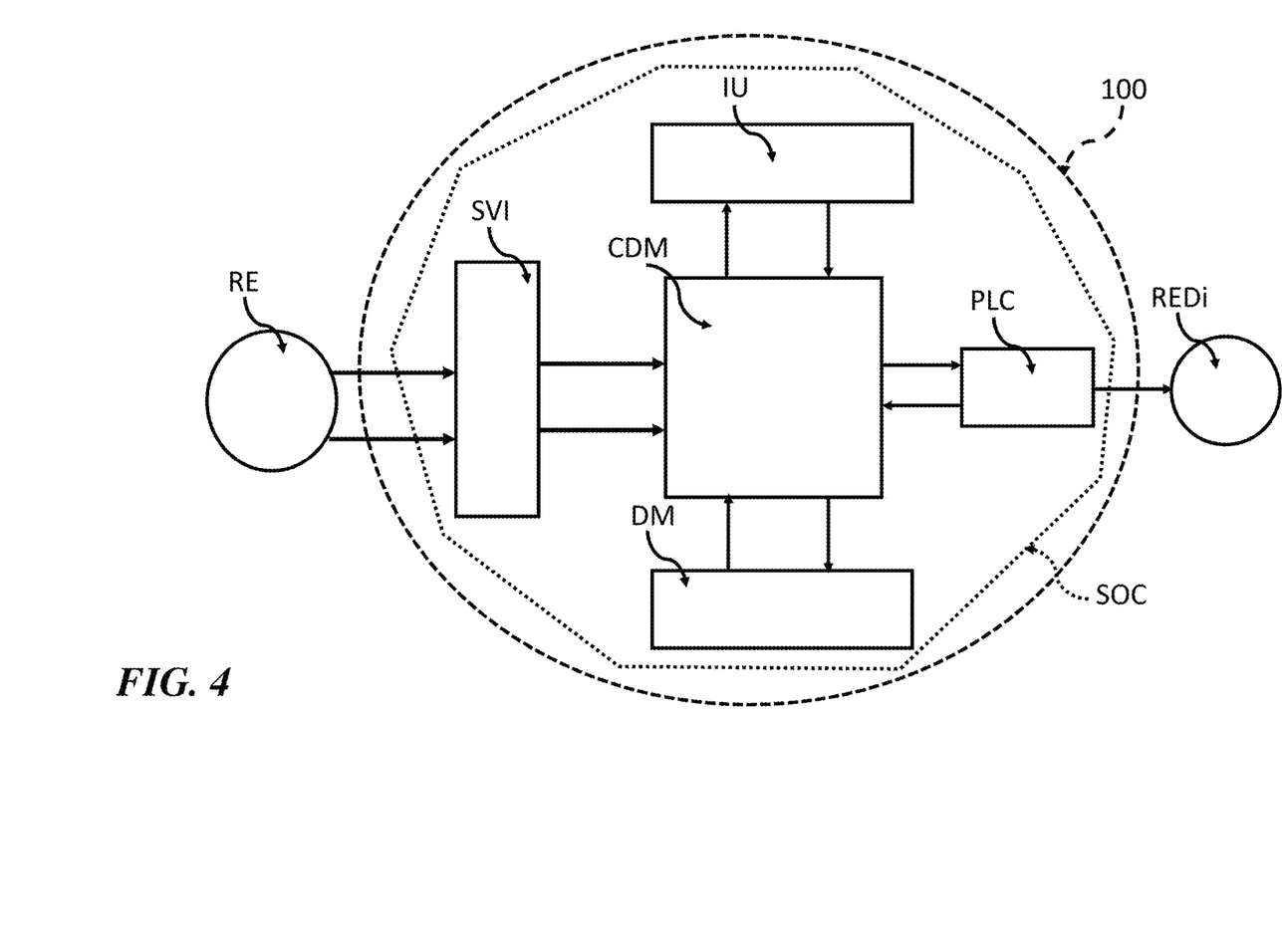
FIG. 4 shows the internal architecture of the System-On-Chip (SOC) used to manage the entire Smart Meter.

The Smart Meter device 100 according to the present invention is schematized with a block diagram in FIG. 4 showing a Smart Meter power device (SME) 100 and the modules therein.

In particular, FIG. 4 shows the power grid RE which is the source of a power signal to be metered.

A digital measuring circuit module CDM, i.e. the metrology section 103, is comprised in the Smart Meter device 100, comprising a System-On-Chip SOC integrated with onboard microprocessor and the devices 105 adapted to supply the Smart Meter device 100.

The System-On-Chip SOC has a PLC powerline communications unit therein for transmitting data to the operator of the power distribution grid REDi, thus complying with the various transmission standards according to the common standard G3, PRIME, Meters-and-More protocols.

The System-On-Chip SOC has a dedicated metrology circuit 103 therein, with sensors SVI for detecting voltages V and currents I on the various phases, a memory device DM 102 for storing data on the consumption and/or production and/or storage dynamics, and a user interface IU 106, which usually is, for example an LCD screen.

Moreover, the Smart Meter device 100 has different local connectivity interfaces.

The main innovative features of the Smart Meter 100 are enclosed in the microcode (firmware) which is stored in the microcontroller.

The microcode is developed according to the paradigms of the real time operating systems RTOS. The microcode simultaneously carries out the functions of metrology, information transmission, data storage, peripheral management. Each of these operations (threads) is carried out in a concurrent manner without interrupting the others.

For obvious safety and consumption data anti-counterfeiting reasons, the energy metering thread lies in a location of the memory DM 102 which is not accessible and is protected in an encrypted manner.

The PLC communication thread manages the data flow to be routed towards the grid operator GRE (outgoing charging data, incoming data such as, for example firmware upgrades or set disconnections) and also the communication network between the various Smart Meters 100.

The main thread manages all the I/O peripherals on the Smart Meter 100. It configures the wired 107 and wireless 108 transmission interfaces and interacts with the other peripherals such as smart plugs and other Smart Meters 100 for domestic services such as water and gas.

In addition to the threads already described, an independent thread manages the creation of network Net between the plurality of Smart Meters 100 using a low-cost computational authentication procedure based on PUFs (Physically Unclonable Functions).

Network Net elects a super-node therein, selected according to the latency times, which it communicates with the concentrator. In the absence of this super-node, it automatically goes to the second elected.

Network Net is built during the installation of the Smart Meters in the individual utilities. The first Smart Meter 100 dialogs with a network controller, conventionally resident in the MV/LV station, and is authenticated by the PUF (Physically Unclonable Functions) algorithm.

Each Smart Meter which is then connected to the same power distribution line will be authenticated in the same manner and will receive the updated table of the network addresses of the other Smart Meters 100 already connected.

At the end of the authentication procedure, or possibly upon the installation of a new Smart Meter 100, network Net is complete and the identifier address table is available and updated on each Smart Meter 100.

At this point, the Smart Meters 100 begin exchanging the information with one another, populating the table while associating the consumption data thereof with the addresses of the other Smart Meters 100.

Network Net thus created is capable of electing a coordinator node by means of election algorithms based on the latency time. At the end of the election procedures, there will be a classification of the nodes whereby, even if the individual elected node were to lose visibility, it would be immediately replaced by the second node in the classification.

The super-node thus identified dialogs directly with the controller node, sending it the table with the consumption data of the entire network Net.

A further thread implemented in the microcode assesses the energy spectrum of the power by means of Fast Fourier Transform (FFT) in order to characterize the different electric loads connected to the Smart Meter 100.

This can be implemented by virtue of a system capable of interfacing between an acquisition module comprising the Smart Meter 100 and the Cloud Based system CLOUD conceived to provide the required data processing and storage. These separate modules are put into communication by means of the HTTP protocol, but the communication may also be commissioned by an additional module of the Smart Meter 100 connected thereto through a communication protocol widely used in the IoT environment, such as MQTT.

Once the frequency spectrum is formed, as described above, the Smart Meter 100 is to be put into communication with the advanced Cloud systems required for the characterization of the loads; such a communication is necessarily web-based and for this reason, the decision was made to use the HTTP (Hyper Text Transfer Protocol) protocol.

The various services (see FIG. 6) are incorporated in Docker containers from Cloud side.

Docker is an open-source project that automates the application deployment in containers, thus providing an additional abstraction, and therefore also an increased security level, by virtue of the virtualization at the Linux operating system level, thus avoiding maintenance and a virtual machine.

Figure 5:
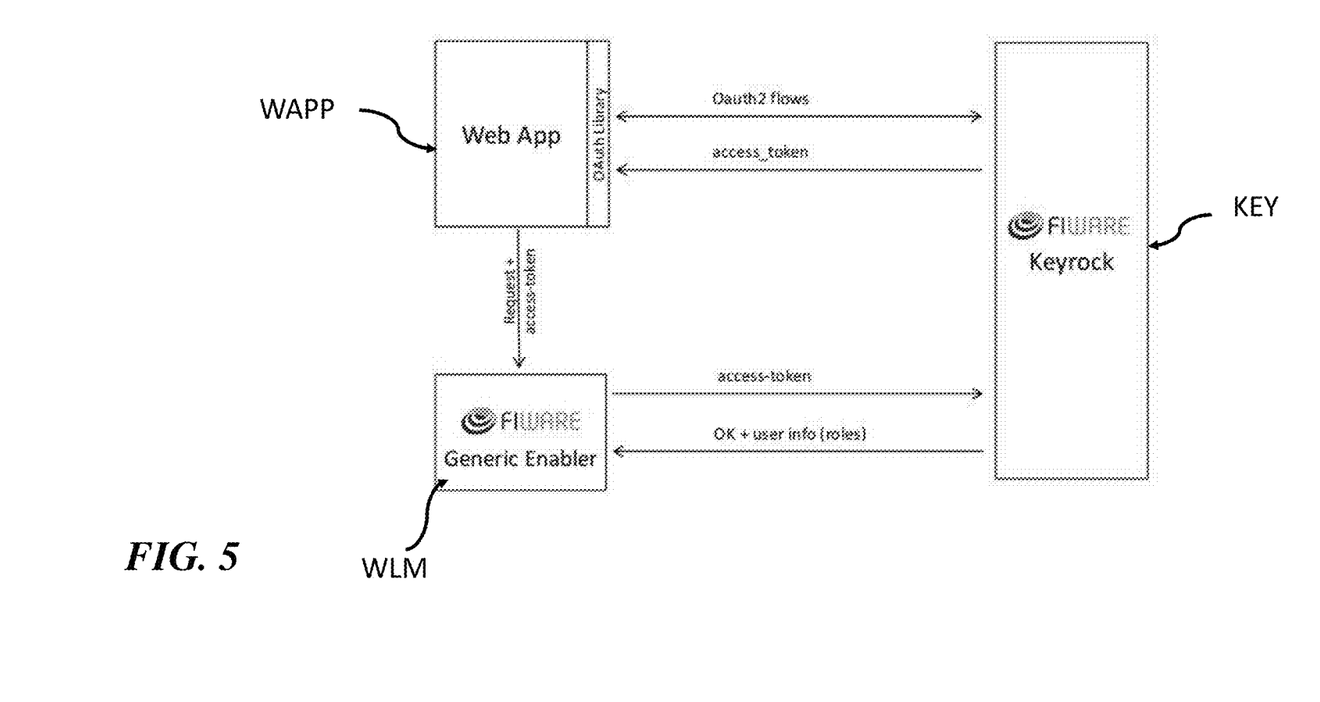
FIG. 5 shows the accounting system based on Fiware Keyrock Generic Enabler and relative flows which result in the generation of the token.

The service required for accounting AM (see FIG. 6) was made available through the use of Fiware Keyrock Generic Enabler containers combined with Wilma PEP Proxy; this allowed managing roles and permissions of the various users by generating Token OAuth 2.0, as shown in FIG. 5; in detail, the accounting system is formed by a web app WAPP, a Wilma PEP Proxy WLM and Keyrock KEY, with the following flow of interactions:

The web app WAPP allows the user to be authenticated by sending access credentials to Keyrock KEY which returns an access token;

Each request sent by the user to Keyrock KEY by means of web app WAPP is sent together with the access token to Wilma PEP Proxy WLM which is the only module capable of directly interacting with Keyrock KEY.

The neural network Neural-Net NN (see FIG. 6) uses the Brain.js library and interacts in the various requests through RESTful APIs exposed by the server web SERV to allow the characterization of the loads, the training of the neural network NN, the addition and elimination of the devices to be characterized.

If it is impossible to obtain complete metered values from the meter, having the exact number of features related to the spectrum, the Node-RED NR (see FIG. 6) Docker container capable of managing the parsing of the data received through JavaScript functions is added on the side of the meter. This allows saving homogeneous data relative to the metered value.

The archiving service (see FIG. 6) is made available by virtue of a non-relational database DB.

Figure 6:
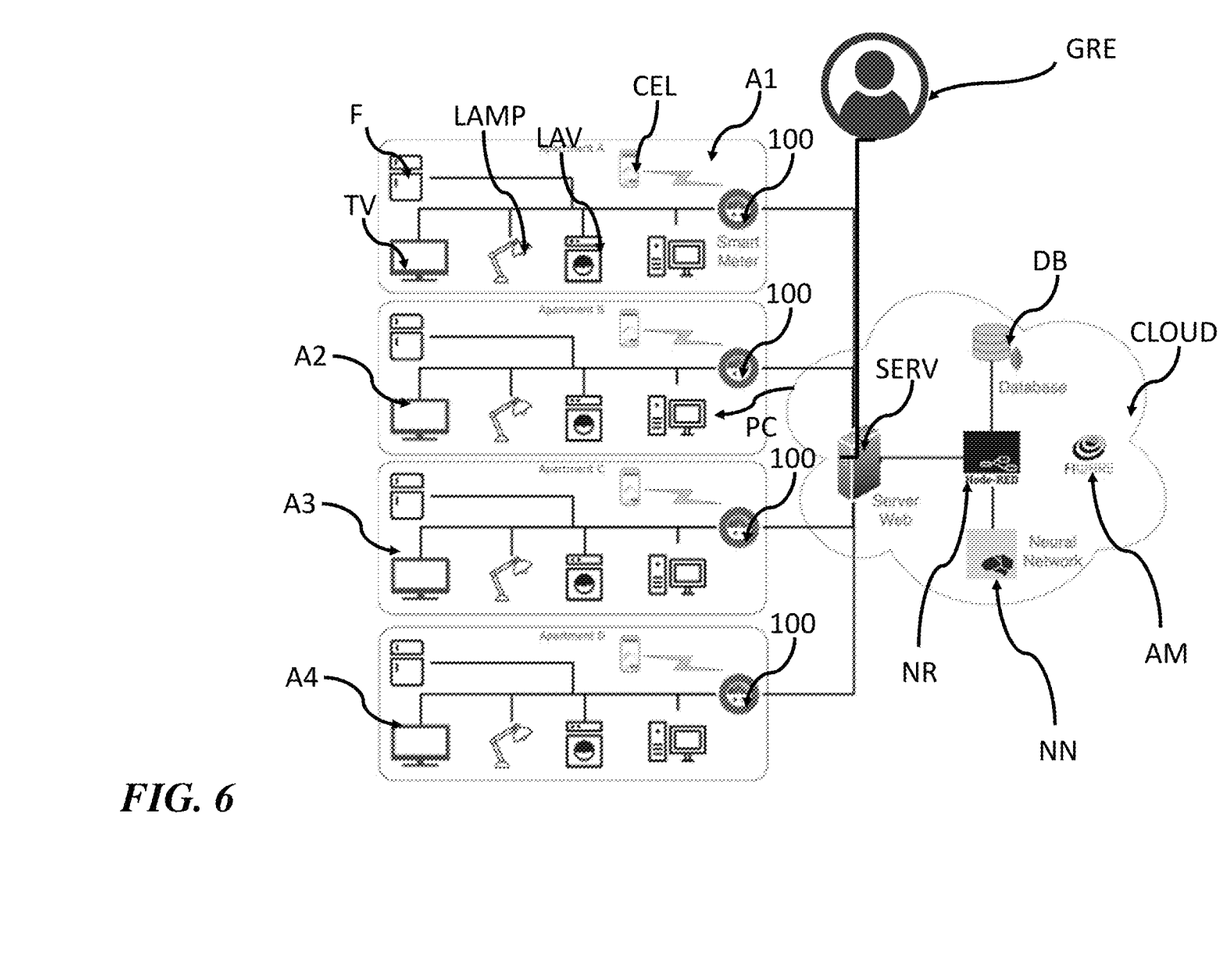
FIG. 6 shows the implemented architecture, where each apartment equipped with a Smart Meter communicates with the Cloud infrastructure and the entities providing the various services.

Database DB called CloudMeter consists of five main collections:

measures collection, where all the metered values from the Smart Meters 100 are collected; identifier ID of the Smart Meter 100 from which the metered value originates is also in this collection so as to be able to trace back to the holder of the latter;

users collection, where all the information associated with the users is collected;

meters collection, where all the information associated with the Smart Meters 100 is collected;

datasets, used to provide a desired formatting to the data to be used to train the neural network; and history collection, used to trace the consumption history of each registered device.

Each operation on the database and on the collections is managed by the server web SERV and the related RESTful APIs; the server web identifies all the diversified users from the relative roles by virtue of the accounting module AM (standard user, Smart Meter 100 or power grid operator GRT) and allows them to make the requests managed by the RESTful APIs which allow the interaction with the collections.

FIG. 6 shows a scenario in which a plurality of apartments A1, A2, A3 and A4 are connected to the power grid operator GRT by means of the aforesaid Smart Meters 100.

In particular, each apartment A1, A2, A3 and A4 comprises a plurality of utilities connected to the Smart Meter 100. In particular, apartment A1 has a refrigerator F, a television TV, one or more light sources LAMP, a washing machine or dishwasher LAV, a wireless cell phone CEL, and a computer PC, which are connected to the power grid depending on the Smart Meter 100.

Figure 7:
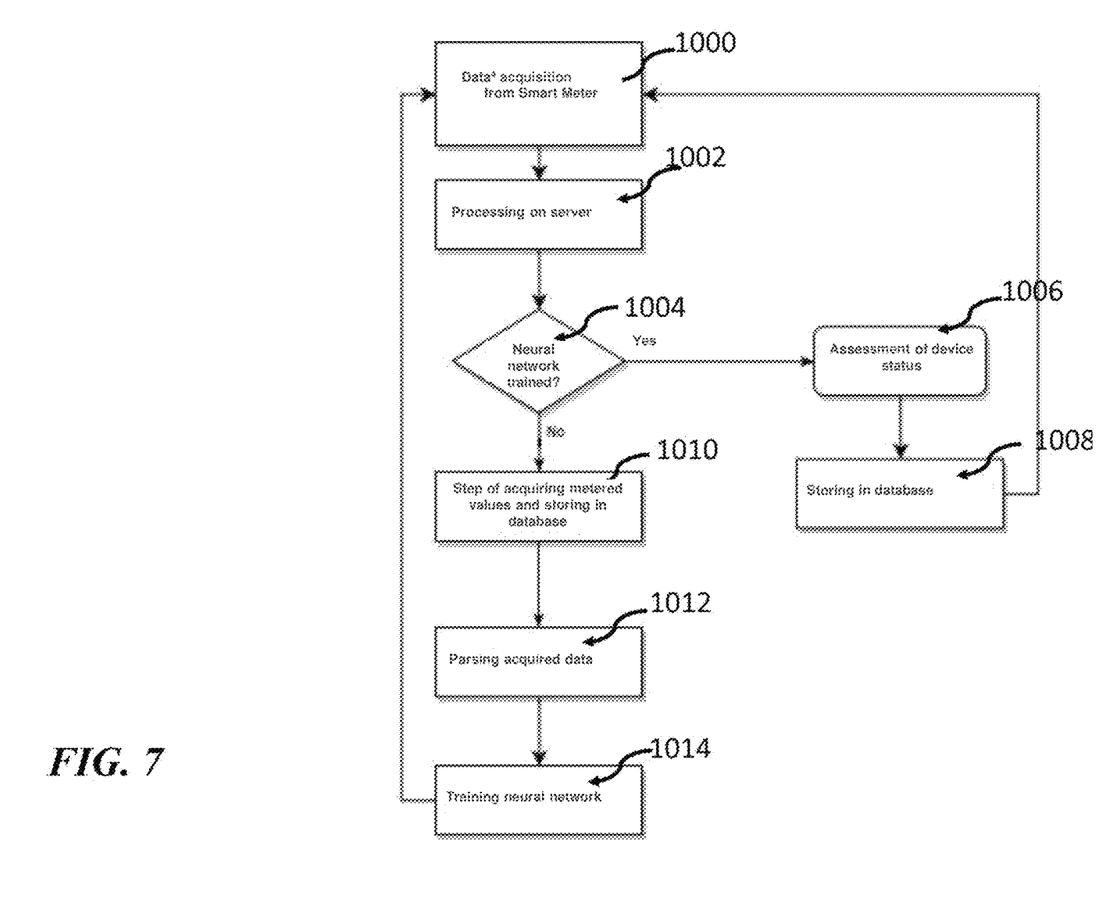
FIG. 7 shows, through a flow chart, the interaction between the collected data and the neural network in the characterization step and in the training step.

The load characterization function is implemented in a neural network described in the flow chart in FIG. 7.

The Smart Meter 100 acquires the data in a step 1000 and the successive processing on the server is in a step 1002. A decisional step 1004 checks whether the neural network is completely trained.

If it is, step 1006 assesses the status of the devices and a successive step 1008 saves in database DB. Finally, the check returns to the data acquisition step 1000.

If it is not, i.e. if the neural network is not completely trained, the function continues with a step 1010 in which there is a metered value acquisition step and the storing in database DB. Then there is a step 1012, in which the data acquired are parsed, and the neural network is trained in a step 1014. At the end of step 1014, the procedure returns to the data acquisition step 1000.

An approach was selected in the case at hand based on the Supervised Learning technique for implementing a feed-forward neural network with an input layer having a number of neurons equal to the number of features of each metered value.

Supervised Learning is an automatic learning technique aiming to train a computer system so as to allow it to automatically process forecasts on the output values of a system with respect to an input, on the basis of a series of ideal examples consisting of pairs of inputs and outputs, which it is initially provided with.

A feed-forward neural network or feed-forward network is an artificial neural network where the connections between the units do not form cycles, thus differentiating themselves from the recurrent neural networks. This type of neural network was the first and simplest among those developed. The information in this neural network moves in one direction alone, forwards, with respect to input nodes, through hidden nodes (if they exist) up to the output nodes. There are no cycles in the network. The feed-forward networks do not have input memory from prior times, whereby the output is determined only by the current input.

Upon the training, the neural network is capable of associating the readings sent thereto as inputs with an output carrier consisting of a number of elements equal to the number of the devices; a number between 0 and 1 is generated for each of these elements; numbers less than the value of 0.5 are coded with the status 0 (Off) of the device, vice versa, greater values are coded with the status 1 (on) of the device at hand.

After a step of data acquisition and training of the neural network NN inherent to a single Smart Meter 100, which is to be repeated in the case new devices are added in an apartment, each metered value acquired by the individual Smart Meter 100 is sent to the server web SERV by means of HTTP protocol, to then be automatically assessed by the corresponding neural network through the related RESTFul APIs exposed by the server web SERV in order to know the status of the devices.

Obviously, the principle of the invention being understood, the construction details and embodiments may be widely varied with respect to what is described and disclosed by way of non-limiting example, without departing from the scope of the present invention.

The invention claimed is:

1. A power distribution system comprising a first Smart Meter device configured for metering the power absorbed or yielded by a domestic utility, wherein said first Smart Meter device is connected to a power distribution grid and dialogs in real time with other Smart Meters connected to other domestic utilities, wherein said other Smart Meters are connected to the same power grid of said first Smart Meter device, wherein said power distribution system builds a system of multiple and comprehensive interconnections which connect said first Smart Meter device to the other Smart Meter nodes so as to form a network, wherein the information on the energy production and consumption status of the network is memorized and available in each Smart Meter node of the network at all times, thus allowing the information on the energy status of the network to be instantaneously available to an operator of the power grid by querying a single Smart Meter among those present in the network, wherein each single Smart Meter has redundantly memorized the entire state of the network including consumption data associated with the addresses of all of the other Smart Meters in the network and therefore, if queried, provides the manager with all the necessary information including information of Smart Meters that are not in direct communication with the single Smart Meter.

2. The system according to claim 1, wherein the network is created so that each Smart Meter node directly communicates with at least three other Smart Meter nodes, and wherein the connections with the remaining Smart Meter nodes occur with indirect connections and the passage through other Smart Meter nodes.

3. The system according to claim 2, wherein the capillary structure of the connections between the Smart Meters allows the operator of the power grid to recover the status of the network even in the presence of local or distributed breakdowns of one or more Smart Meters.

4. The system according to claim 3, wherein the network is built with a redundancy in the connections so that each individual Smart Meter node can be reached by a plurality of other Smart Meters, thus providing the system with an optimal fault-tolerance of the network.

5. The system according to claim 4, wherein the communications between the Smart Meters occur through the standard G3, PRIME or Meters-and-More protocols on conveyed wave powerlines.

6. The system according to claim 5, wherein each Smart Meter has local connectivity according to wireless protocols such as Bluetooth, Wi-Fi, NFC or wired protocols such as Ethernet, MODBUS, CANBUS.

7. The system according to claim 6, wherein the system comprises an independent module which manages the creation of the network between the plurality of Smart Meters using a low-cost computational authentication procedure based on Physically Unclonable Functions.

8. The system according to claim 7, wherein the system builds the network during the installation of the Smart Meters in the individual utilities, wherein the first Smart Meter dialogs with a network controller and is authenticated by the Physically Unclonable Function algorithm, wherein each Smart Meter which is then connected to the same power distribution grid will be authenticated in the same manner and will receive the updated table of the network addresses of the other Smart Meters already connected, and wherein the Smart Meters exchange the information with one another, populating the table and associating the consumption data with the addresses of the other Smart Meters.

9. The system according to claim 8, wherein the network created is capable of electing a coordinator node by means of election algorithms based on the latency time, and wherein at the end of the election procedures, there will be a classification of the nodes so that even if the individual elected node were to lose visibility, it would be immediately replaced by the second node in the classification.

10. A Smart Meter device for metering power to be used in the system according to claim 1, wherein said Smart Meter device comprises:
a system for processing information,
a memory,
a metrology section,
a PLC line driver,
a power supply system,
a display,
one or more wired network interfaces, and
one or more wireless network interfaces.

11. The Smart Meter device according to claim 10, wherein the sampling of the voltage and current, or of the voltages and currents in the case of three-phase utility, and the assessment of the power are carried out in said metrology section through integration algorithms of the electrical power metered, wherein such a sampling operation is carried out over any time range according to the legislative needs and to the power grid operator.

12. The Smart Meter device according to claim 11, wherein in addition to the algorithms already programed in the firmware for implementing the metering function, the Smart Meter device has an autonomous algorithm for building an ad-hoc network connection, without operations by controller nodes upon the installation of the first Smart Meter on the network.

13. The Smart Meter device according to claim 12, wherein said Smart Meter device comprises a digital measuring circuit module as the metrology section and a System-On-Chip integrated with onboard microprocessor.

14. The Smart Meter device according to claim 13, wherein said System-On-Chip has a powerline communications unit therein for transmitting data to the operator of the power grid, thus complying with the various transmission standards according to the common standard G3, PRIME, Meters-and-More protocols.

15. The Smart Meter device according to claim 14, wherein said System-On-Chip has a dedicated metrology circuit therein, with sensors for detecting voltages and currents on the various phases, a memory device for storing data on the consumption and/or production and/or storage dynamics, and a user interface such as an LCD screen.

16. The Smart Meter device according to claim 15, wherein the onboard code of the System-On-Chip simultaneously carries out the functions of metrology, information transmission, data storage, peripheral management in a concurrent manner without interrupting the others.

17. The Smart Meter device according to claim 16, wherein for safety and consumption data anti-counterfeiting reasons, the energy metering operation lies in a location of the memory which is not accessible and is protected in an encrypted manner.

18. The Smart Meter device according to claim 10, wherein said Smart Meter:
acquires data;
processes said data by means of Fast Fourier Transform, and
transmits the processed data to a server.

19. A method for generating the neural network to be used in a system according to claim 1, which comprises a plurality of Smart Meter devices connected thereto, and wherein the system performs the acquisition of the data relative to the Smart Meters, the assessment of the status of the Smart Meter devices and the storage of the data in the database.

20. The method for generating the neural network according to claim 19, wherein the neural network dialogs with one or more Smart Meters, and wherein the neural network is based on the Supervised Learning technique for implementing a feed-forward neural network with an input layer having a number of neurons equal to the number of features of each metered value.

21. The method for generating the neural network according to claim 20, wherein said suitably trained neural network is adapted to trace the configuration of loads connected to the Smart Meter.

* * * * *